United States Patent Office 2,884,441
Patented Apr. 28, 1959

2,884,441

METHOD OF PREPARING B-HYDROCARBON-SUBSTITUTED BORON COMPOUNDS

Stephen J. Groszos, Darien, Conn., assignor to American Cyanamid Company, New York, N.Y., a corporation of Maine No Drawing. Application October 21, 1957
Serial No. 691,172

10 Claims. (Cl. 260—462)

This invention relates to a method of preparing B-hydrocarbon-substituted boron compounds. More particularly, the invention is concerned with certain new and useful improvements in a method of making such compounds by reacting an ester of an oxy acid of boron with a hydrocarbon halide while the reactants are in intimate contact with sodium (metallic sodium) and, also, a lithium halide selected from the class consisting of lithium chloride and lithium bromide. (The use of sodium and a lithium salt, rather than metallic lithium, in the process of this invention provides marked economies in manufacturing costs.) The ester of the oxy acid of boron (i.e., the starting ester reactant) is one in which the ester component thereof is represented by $-(OR)_n$ wherein R represents a hydrocarbon radical and $n$ represents an integer from 1 to 3, inclusive. The scope of the invention also includes the additional steps, if desired, of hydrolyzing, preferably under acidic conditions, the product obtained from the first reaction and isolating the hydrolyzed product as such or as an isolable derivative thereof. The hydrolysis product comprises a hydrocarbon-substituted boronic acid or a borinic acid when the starting ester reactant is, respectively, a borate or a hydrocarbon-substituted boronate.

The prior methods of preparing, for instance, boronic acids have generally involved an organo-metallic compound as one of the reactants and a boron trihalide or a trialkyl borate as a second reactant. Thus, Kraus and Nitsche [Ber., 51, 2784 (1921); and Ber., 55, 1261 (1922)] used the technique represented by the following simplified equation:

I
$$RMgX + BF_3 \xrightarrow{\text{(excess)}} BR_3 \xrightarrow{O_2} RB(OR)_2 \xrightarrow{H_2O} RB(OH)_2$$

Numerous other investigators [e.g., Khotinsky and Melamed, Ber., 42, 3090 (1909)] have prepared boronic acids by the addition of an ether solution of a trialkyl borate to an ether solution of a Grignard reagent maintained at about $-70°$ C., as represented by the following simplified equation:

II
$$B(OR)_3 + R'MgX \xrightarrow{Et_2O} R'B(OR)_2 \xrightarrow{H_3O^+} R'B(OH)_2$$

Hydrolysis of the boronic ester, preferably under acidic conditions as indicated in the equation, liberates the free acid. (In Equation II and in other equations herein the symbol $H_3O^+$ means acidic water, which can also be represented by $H^+, H_2O$.)

Each of the methods represented by Equations I and II has the disadvantage of requiring the separate step of preparing a Grignard reagent (or a lithium reagent which also has been employed in the prior art instead of a Grignard reagent). Additionally, the manipulation (as in the method of Equation I) of water-sensitive gaseous reactants, such as $BF_3$, is frequently troublesome, and this is particularly true when the reaction is carried out on a small scale. Furthermore, there are the inherent disadvantages in both methods of using diethyl ether or other liquid medium in which the reaction between the primary reactants is effected. The use of a large volume of a liquid reaction medium is uneconomical from the standpoint of large volume of reactor space that is required; and, for this reason, is generally unsatisfactory for large-scale syntheses from a cost and design standpoint.

It is a primary object of the present invention to provide an improved method of preparing certain B-hydrocarbon-substituted boron compounds, hereafter more fully described, which method obviates the above-mentioned disadvantages of the prior art methods, namely: eliminates the necessity for the separate preparation of a Grignard or lithium reagent and the use of ether (diethyl ether) or other solvent as a liquid medium in which the reaction is effected.

Another object of the invention is to provide an improved method of preparing certain compounds of boron which requires less reactor space than the prior art processes and, also, is more suitable for large-scale syntheses and makes it possible to produce the compound in a shorter period of time than the prior methods.

Other objects of the invention will be apparent to those skilled in the art from the following more detailed description of the invention.

The objects of the invention are attained by reacting (1) an ester of an oxy acid of boron of the kind set forth in the first paragraph of this specification with (2) a hydrocarbon halide, more particularly a hydrocarbon chloride, bromide, or iodide, while the said reactants are intimately associated with metallic sodium and, also, lithium chloride or bromide (or a mixture of these lithium salts in any proportions).

When the starting boron reactant is a boron triester, the reaction may be illustrated by the following simplified equation:

III
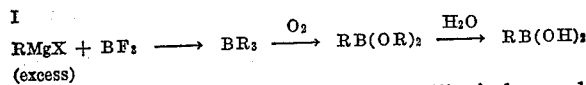
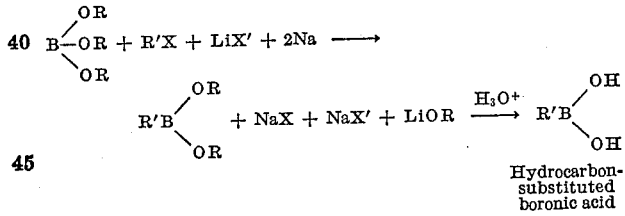

Hydrocarbon-substituted boronic acid

When the starting boron reactant is a boron diester, the reaction may be illustrated by the following simplified equation:

IV
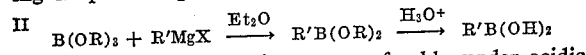
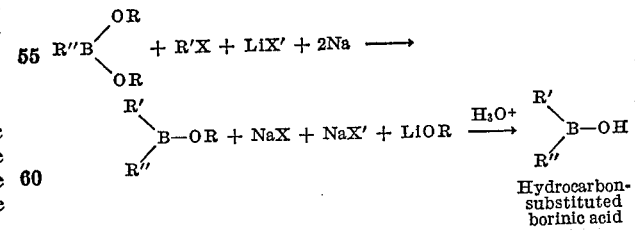

Hydrocarbon-substituted borinic acid

The hydrocarbon-substituted borinic acid can be dehydrated, by heating, to yield the corresponding borinic anhydride, thus:

V
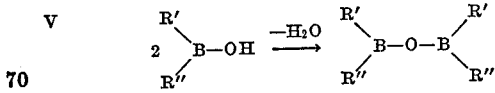

When the starting boron reactant is a boron monoester, the reaction may be illustrated by the following simplified equation:

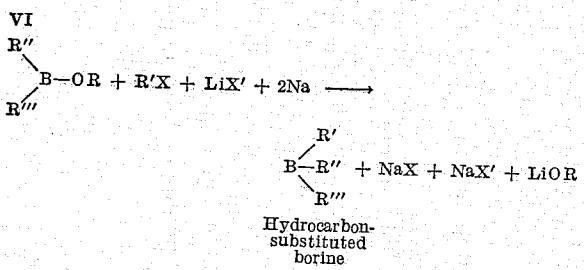

$$\text{VI} \quad \begin{array}{c} R'' \\ \diagdown \\ B-OR \\ \diagup \\ R''' \end{array} + R'X + LiX' + 2Na \longrightarrow$$

$$\begin{array}{c} R' \\ \diagup \\ B-R'' \\ \diagdown \\ R''' \end{array} + NaX + NaX' + LiOR$$

Hydrocarbon-substituted borine

In the above equations (including Equations I and II) R, R′, R″, and R‴ each represent a hydrocarbon radical, and they may be the same or different.

Illustrative examples of hydrocarbon radicals represented by R, R′, R″, and R‴ where they appear in Equations III, IV, V, and VI are alkyl (including cycloalkyl), alkenyl (including cycloalkenyl), aralkyl, aralkenyl, aryl, alkaryl, and alkenylaryl. More specific examples of such radicals are methyl, ethyl, propyl, isopropyl, butyl, isobutyl, sec.-butyl, amyl, isoamyl, hexyl to tetracontyl, inclusive (both normal and isomeric forms), cyclopentyl, cyclopentenyl, cyclohexyl, cyclohexenyl, cycloheptyl, etc.; benzyl, phenylethyl, phenylpropyl, phenylisopropyl, phenylallyl, fluorenyl, dinaphthylenemethyl, etc.; phenyl, biphenylyl or xenyl, naphthyl, anthryl, naphthyl-substituted anthryl and dianthryl, etc.; tolyl, xylyl, ethylphenyl, proplyphenyl, isopropylphenyl, butylphenyl, allylphenyl, etc.; and vinyl, allyl, methallyl, propenyl, isopropenyl (β - allyl), 1 - butenyl, 2 - butenyl (crotyl), 3 - butenyl, pentenyl, hexenyl, butadienyl, etc. It will be noted that all of the foregoing examples of hydrocarbon radicals are those wherein any unsaturation between adjacent carbon atoms is a double bond. In the formula R′X appearing in Equations III, IV, and VI, X represents a halogen selected from the class consisting of chlorine, bromine, and iodine; and in the formula LiX′ appearing in these same equations, X′ represents a halogen selected from the class consisting of chlorine and bromine.

In carrying the present invention into effect, the lithium halide and sodium reactants are preferably employed in the molar ratio of 1 mole of the former to 2 moles of the latter. However, equal molar proportions of each can be used, in which case part of the lithium halide remains as such in the reaction mass. More than 2 moles of sodium per mole of lithium halide can be employed, but is generally undesirable since, with such molar proportions, the hydrocarbon halide reactant can enter into a coupling reaction with the excess sodium and form undesirable by-products (R′—R′).

The hydrocarbon halide and metallic lithium halide can be used in stoichiometric (equal molar) proportions, or with the one or the other in excess, e.g., from 1 to 100 percent of the one in excess over stoichiometric proportions with respect to the other; that is, the said hydrocarbon halide and lithium halide are employed in a molar ratio of 1:2 moles of the former to 2:1 moles of the latter. The ratio of boron ester to hydrocarbon halide employed is in equimolar (equimolecular) or, preferably, in excess of equimolar proportions, e.g., from about 10 mole percent to about 1500 mole percent in excess of equimolar proportions; that is, the said boron ester and hydrocarbon halide are employed in a molar ratio of from 1 to 16 moles of the former per mole of the latter. The excess to which reference is made in the preceding sentence can be achieved in, for example, two ways. Where the hydrocarbon halide and lithium halide are in equimolar (equimolecular) amounts, the boron triester can be present in the molar ratios set forth in the second sentence of this paragraph. On the other hand, if the hydrocarbon halide and the said boron triester are present in equimolar ratio, the lithium halide can be present in less than equimolar ratio as compared with the hydrocarbon halide.

The excess boron ester functions primarily as a reaction medium (generally a liquid at the temperature of the reaction) in which the reaction between the primary reactants is effected, and thus aids in controlling the reaction. The boiling point of the particular boron ester employed and the rate of addition of the hydrocarbon halide are each helpful in controlling the rate of reflux and/or the reaction temperature. Good results have been obtained, preferably in producing a boronate or a boronic acid, by using the boron-ester starting reactant in from 300 to 600 mole percent in excess of equimolar proportions with respect to the hydrocarbon halide reactant.

Within the ratios of reactants mentioned above, one also can control to some degree the proportions of predominating reaction products in the reaction mass. Thus, starting with a triester of boric acid and, when one desires to obtain mainly a boronate (or the corresponding boronic acid), one can use the said triester in a relatively large molar excess (e.g., from 10 to 100 mole percent in excess) over the hydrocarbon halide. If one desires to produce mainly a borinate (or the corresponding borinic acid), one can use the said triester in equimolar or only a slightly molar excess (e.g., from 0.1 to 9.9 mole percent in excess) over the hydrocarbon halide. And if one desires to obtain mainly a borine, one can use the hydrocarbon halide in equimolar or in molar excess with respect to the boron triester but greater than equimolar proportions with respect to the lithium halide.

The reaction between the primary reactants is effected at a temperature of from about 75° C. up to a temperature corresponding to the reflux temperature of the reaction mass. In general, the temperature above about 95° C. at which the reaction is effected is governed primarily by the boiling point of the mixture of organic reactants. When this temperature is below about 75° C., e.g., when the boron ester is trimethyl borate (boiling point, 67°–69° C.), the reaction should be carried out under superatmospheric pressure sufficient to raise the boiling point to the desired degree. When the boiling point of the reaction mass is above about 100° C., the reaction is generally effected at atmospheric pressure; but superatmospheric pressures can be employed as desired or as may be required in order to attain a sufficiently high reaction temperature. Reaction temperatures ranging, for instance, between about 75° C. and about 300° C., more particularly from about 95° C. to about 275° C., are generally satisfactory.

The period of reaction will vary considerably and will depend upon such influencing factors as, for instance, the particular starting reactants employed, the particular reaction products wanted, the temperature at which the reaction is effected, the size, type, and kind of reaction apparatus employed and other influencing factors. Thus, the period of reaction may range from ½ to 48 hours or more.

Preferably the sodium is in molten state at the temperature of the reaction. However, it also may be used in finely divided state when the reaction temperature is below the melting point of sodium.

The processing steps subsequent to the termination of the reaction between the primary reactants will vary considerably, and the particular procedure employed is largely influenced by the particular starting reactants used and the particular product or products wanted. As illustrative of the various techniques that can be used, the following is mentioned.

One can isolate the boron-ester reaction products [R′B(OR)$_2$, R′R″B(OR)] and the borine, R′R″R‴B, by adding a suitable anhydrous alcohol (ROH) in order to destroy any unreacted metallic sodium. The precipitated salts can then be filtered off and the filtrate subjected to a fractional distillation in order to separate unreacted borate, i.e., starting material, B(OR)$_3$, the boronate, R'B(OR)$_2$, the borinate R'R"B(OR), and the borine, R'R"R'"B.

The hydrolysis products, mainly the boronic and borinic acids, are produced by hydrolyzing, preferably under aqueous acidic conditions, the isolated (if this has been done) B-hydrocarbon-substituted boron-ester reaction product; or by hydrolyzing, also preferably under aqueous acidic conditions, the reaction mass containing the unisolated reaction products. In either case, hydrolysis can be effected at temperatures ranging, for example, from −50° C. to 100° C. Hydrolysis is preferably effected at a temperature sufficiently high to maintain the boron-ester reaction product, or reaction mass containing the same, in liquid state.

Any acid can be used to provide the acidic conditions for hydrolysis, in an aqueous medium, of the isolated boron-ester reaction product. To provide the acidic conditions for hydrolysis, in an aqueous medium, of the reaction mass containing small amounts of lithium-hydrocarbons, any acid that will cause the lithium hydroxide that forms to dissolve can be used. A mineral acid (or its obvious equivalent) can be employed, e.g., hydrochloric, hydrobromic, sulfuric, phosphoric, dichloroacetic, trichloroacetic, etc. A weak acid or an acidic or potentially acidic body can also be used to provide the acidic conditions, e.g., ammonium chloride, ammonium sulfate, acetic acid.

Since the borinic acids, R'R"BOH, are not isolable in a pure state, they can be converted to readily isolable derivatives (e.g., the anhydride, the monoethanolamine ester, etc.) which, if desired, can then be readily converted to the borinic acid.

The borines, R'R"R'"B, can be isolated in, for example, the following manner: The reaction mass, after being freed of the sodium and lithium compounds, as described above, can be subjected to distillation carried out in such a manner as to allow the separation of the borine from the boronate and borinate esters.

In order that those skilled in the art may better understand how the present invention can be carried into effect, the following examples are given by way of illustration and not by way of limitation. All parts and percentages are by weight unless otherwise stated.

*Example 1*

A round-bottomed flask fitted with stirrer, condenser, two dropping funnels, nitrogen inlet and drying tube at outlet end of condenser is charged with 5.75 g. (0.25 g. atom) sodium metal, 10.6 g. (0.25 mole) lithium chloride and 56 g. (54.5 ml., 0.25 mole) tri-n-butyl borate. A few ml. bromobenzene is added, and the reaction mixture is heated to reflux (228°–229° C.). Bromobenzene (39.25 g., 0.25 mole) and 174 g. (217.5 ml., 0.75 mole) tri-n-butyl borate are then added concurrently (through the two dropping funnels) while maintaining the reaction mixture at reflux. After addition is complete, the reaction mass is refluxed for an additional two hours. A light blue color is observed in the reaction mass at this time. Excess butyl borate is then distilled off, and, after cooling, the residue is treated with n-butanol (5 to 10 ml.) to destroy any unreacted sodium. The mass is then hydrolyzed by pouring it into 200 ml. of 10% aqueous HCl.

The acidic water solution is extracted with three 100 ml. portions of ether. The combined ether solutions are then extracted with several portions of 5%–10% aqueous NaOH until the washings are basic to pH paper. The combined basic aqueous extracts are then washed once with ether, the ether extract is discarded and the basic aqueous layer is acidified with 10% aqueous HCl. The acidic solution is then extracted with three 30 ml. portions of ether. The combined ether extracts are evaporated to dryness on a water bath to leave a residue identified by infrared analysis as faily pure phenylboronic acid. Recrystallization from hot water yields pure phenylboronic acid.

*Example 2*

Exactly the same procedure is followed as is described under Example 1, down to the hydrolysis step. To the reaction mass, with external cooling (ice bath), is added through an additional funnel enough anhydrous n-butanol to destroy all of the unreacted sodium (about 20 ml. n-butanol). The reaction mass is filtered and the filtrate is distilled. After removing solvent and butanol, the desired ester (di-n-butyl phenylboronate) is obtained by distillation at reduced pressure.

*Example 3*

The same general procedure is followed as described under Example 1, but using 0.5 g. atom potassium, 2.5 moles tri-n-propyl borate, 0.5 mole lithium chloride, and 0.5 mole n-butyl chloride. After the addition of the chloride has been completed, the reaction mixture is maintained at reflux temperature for about 20 hours. Isolation of the product as described under Example 1 gives n-butylboronic acid; melting point 76°–91° C.

*Example 4*

Sodium (5.75 g., 0.25 g. atom), 146 g. (1 mole) triethyl borate, and 10.6 g. (0.25 mole) lithium chloride are placed in a 500 ml. capacity rocking-type autoclave fitted with a flexible inlet tube through which a liquid can be introduced under pressure. While the reaction mixture is agitated, the temperature is raised to 130° C. and 79.9 g. (0.27 mole) n-dodecyl iodide is introduced in portions. An indication of reaction taking place is a rise in temperature and pressure in the autoclave during the course of the addition. After addition is complete, the reaction mixture is heated to 200°–250° C. and maintained in this temperature range for a period of about six hours. At the end of the reaction period, the autoclave is allowed to cool to room temperature and opened cautiously by means of a valve to release any pressure that may remain. The autoclave is opened and the wet solid treated with 50 ml. ethanol to destroy unreacted sodium. Aqueous sulfuric acid (10%) is added with cooling and stirring until the reaction mass is acid to pH paper. The reaction mass is then extracted with several portions of ether. The combined ether solutions are extracted with 5% aqueous NaOH solution, the aqueous layer acidified (to pH paper) with 10% aqueous sulfuric acid and then extracted with three portions of ether. The wet, ether layer is evaporated on the water bath under a stream of nitrogen to leave an oil which, on standing, turns to a light, yellow-colored waxy solid comprised of n-dodecyl boronic acid.

*Example 5*

Trimethyl borate (104 g., 1.0 mole), 5.75 g. (0.25 g. atom) sodium, and 21.9 g. (0.25 mole) lithium bromide are placed in a 500 ml. stainless steel autoclave, which is part of a rocking-type pressure apparatus. The autoclave is heated to about 120° C. under autogenous pressure, and 39.25 g. (0.25 mole) bromobenzene is introduced under nitrogen pressure in portions over a 30-minute period. At the end of the addition, the temperature is raised to about 225° C. and maintained at this temperature, with agitation, for a period of about ten hours. The reaction mass is then worked up in the manner described in Example 4 to give pure phenylboronic acid after recrystallization from hot water.

*Example 6*

Cyclohexyl bromide (81.5 g., 0.5 mole), 11.5 g. (0.5 g. atom) sodium, 21.2 g. (0.5 mole) lithium chloride, and 345 g. (1.5 moles) n-butyl borate are reacted together in the manner described under Example 1 with a 24-hour reflux period. The reaction mass is worked up in the manner described in Example 2 to yield n-butyl(dicyclohexyl)borinate and some di-n-butyl(cyclohexyl)boronate.

Example 7

The preparation of di-n-amyl(allyl)-boronate (di-n-amyl ester of allylboronic acid) is carried out in the manner described under Example 1 by reacting 12.1 g. (0.1 mole) allyl bromide with 2.3 g. (0.1 g. atom) sodium, 4.25 g. (0.1 mole) lithium chloride, and 272 g. (1 mole) tri-n-amyl borate. A polymerization inhibitor can be added during the isolation steps.

Example 8 p-Bromotoluene (171 g., 1 mole) is added to 23 g. (1 g. atom) sodium, 42.5 g. (1 mole) lithium chloride, and 230 g. (1 mole) tri-n-butyl borate over a period of 15 minutes at a temperature of 135° C. The reaction mixture is refluxed for about ten hours. The reaction mass is then cooled and hydrolyzed to an acid pH with 10% aqueous hydrochloric acid. The reaction mass is extracted with ether, and the ether layer is washed with two portions of 5% aqueous NaOH solution. After separating the organic layer and washing with water, the ether is removed by distillation under a nitrogen atmosphere. The residue is then fractionally distilled under nitrogen to give a fraction comprising tri-tolylborine.

Example 9

Sodium (2.3 g., 0.1 g. atom), 104 g. (1 mole) trimethyl borate, and 8.7 g. (0.1 mole) lithium bromide are placed in an autoclave. Benzyl bromide (17.1 g., 0.1 mole) is added under pressure at 120° C., and the reaction is conducted in the manner described in Example 4. The reaction mass is then worked up as described in Example 1 to yield benzylboronic acid, melting point 195°–215° C.

Example 10 n-Butyl bromide, di-n-butyl(phenyl)-boronate, sodium, and lithium chloride are reacted in the mole ratios of 1:5:1:1 (1 mole of Na=1 g. atom) in the manner described in Example 1 to yield crude phenyl(n-butyl)borinic acid, a light yellow oil. Distillation in vacuo of this oil yields the anhydride

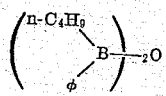

(The symbol "φ" represents the phenyl radical, $C_6H_5-$.) The oil can be treated with an aqueous ethanolic solution of ethanolamine which results in the separation of the crystalline aminoethyl[phenyl(n-butyl)]borinate,

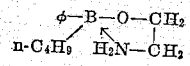

Example 11

When n-butyl bromide, sodium, lithium chloride, and tri-n-butyl borate are reacted together in the mole ratios 1:1:1:2 in the manner described in Example 6, n-butyl-(dibutyl)borinate is isolated in addition to some di-n-butyl(butyl)boronate.

Example 12

Bromobenzene (157 g., 1 mole), 23 g. (1 g. atom) sodium, 42.5 g. (1 mole) lithium chloride, and 230 g. (1 mole) tri-n-butyl borate are allowed to react in the manner described in Example 2 to yield, after fractional distillation, n-butyl(diphenyl)borinate. 23.8 g. (0.1 mole) n-butyl(diphenyl)borinate obtained in this manner or by methods reported in the literature is reacted with 2.3 g. (0.1 g. atom) sodium, 8.7 g. (0.1 mole) lithium bromide, and 15.7 g. (0.1 mole) bromobenzene at 220°–250° C. for a period of about 20 hours. The reaction mass is cooled and hydrolyzed by adding it to cold 10% aqueous sulfuric acid. An ether extract of this solution is, in turn, extracted with three portions of 5% aqueous NaOH, washed with water, dried over anhydrous $Na_2SO_4$ and distilled, first at atmospheric pressure and then in vacuo. It is important to exclude oxygen during these operations and all manipulations are conducted in a nitrogen atmosphere. The fraction boiling at 203° C./15 mm. is triphenyl boron (triphenyl borine), melting point 137° C.

Example 13

Tri-n-butyl borate (1 mole), n-hexyl bromide (2.5 moles), sodium (3 g. atoms), and lithium chloride (3 moles) are reacted together under the conditions given in Example 12. The reaction product is hydrolyzed with 10% aqueous sulfuric acid and extracted with ether. The ether solution contains a mixture of n-hexylboronic acid, di-n-hexylborinic acid, and tri-n-hexyl boron (tri-n-hexyl borine). Extraction with 5% aqueous NaOH leaves the tri-n-hexyl boron in ether solution, from which it can be isolated by distillation; boiling point 97° C./0.002 mm.

The basic solution of the boronic and borinic acids is acidified with aqueous hydrochloric acid and extracted with ether. The ether is removed on a water bath and the residue is taken up in aqueous ethanol. Addition of monoethanolamine causes the borinic acid to crystallize as the aminoethyl(di-n-hexyl)borinate.

The solution containing the boronic acid is evaporated on a steam bath to dryness, extracted with ether, the ether solution evaporated, and the residue recrystallized from hot water to yield n-hexylboronic acid. Recrystallization from methylene chloride affords a product, melting point 70° C. Recrystallization from water raises the melting point to 88°–90° C. In all of the operations described above, oxygen is excluded by working in a nitrogen atmosphere.

I claim:

1. The method which comprises reacting together (1) a halide represented by the general formula (a) R'''X wherein R''' has the meaning hereinafter given, and X represents a halogen selected from the class consisting of chlorine, bromine and iodine, and (2) an ester of an oxy acid of boron selected from the class consisting of those represented by the general formulas (b) 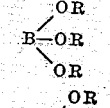

(c) 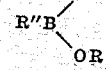

and (d) 

wherein R''' in formula (a), and R, R' and R'' where they appear in formulas (b), (c) and (d) represent a hydrocarbon radical wherein any unsaturation between adjacent carbon atoms is a double bond, said reaction being effected under anhydrous conditions, at a temperature of from about 75° C. up to a temperature corresponding to the reflux temperature of the reaction mass, and while the reactants of (1) and (2) are in intimate contact with metallic sodium and a lithium halide selected from the class consisting of lithium chloride and lithium bromide, the said lithium halide and metallic sodium being employed in a molar ratio of 1 mole of the former to from 1 to 2 moles of the latter, the halide of (a) and the said lithium halide being employed in a molar ratio of 1:2 moles of the former to 2:1 moles of the latter, and the said ester of (2) and the halide of (a) being employed in a molar ratio of from 1 to 16 moles of the former to 1 mole of the latter.

2. A method as in claim 1 wherein the ester of the oxy acid of boron is a triester of boric acid, said triester being represented by the formula

wherein each R represents a hydrocarbon radical wherein any unsaturation between adjacent carbon atoms is a double bond.

3. A method as in claim 2 wherein the triester of boric acid is tributyl borate.

4. A method as in claim 1 wherein the ester of the oxy acid of boron is a diester of a boronic acid, said diester being represented by the formula

wherein R'' and each R represents a hydrocarbon radical wherein any unsaturation between adjacent carbon atoms is a double bond.

5. A method as in claim 1 wherein the ester of the oxy acid of boron is a monoester of a borinic acid, said monoester being represented by the formula

wherein R, R', and R'' each represent a hydrocarbon radical wherein any unsaturation between adjacent carbon atoms is a double bond.

6. A method as in claim 1 wherein X in the formula R'''X for the halide of (a) is bromine.

7. A method as in claim 1 wherein the halide of (a) is bromobenzene.

8. A method as in claim 1 which includes the additional steps of hydrolyzing, under acidic conditions, the ester product obtained from the first reaction; and isolating the hydrolyzed product.

9. The method of preparing phenylboronic acid which comprises reacting, under anhydrous conditions and at a temperature of from about 75° C. up to a temperature corresponding to the reflux temperature of the reaction mass, bromobenzene and a molecular excess, with respect to the said bromobenzene, of a trialkyl borate while the said reactants are in intimate contact with metallic sodium and a lithium halide selected from the class consisting of lithium chloride and lithium bromide, the said lithium halide and metallic sodium being employed in a molar ratio of 1 mole of the former to from 1 to 2 moles of the latter, the aforesaid bromobenzene and the said lithium halide being employed in a molar ratio of 1:2 moles of the former to 2:1 moles of the latter, and the molecular excess of trialkyl borate employed being from about 10 mole percent to about 1500 mole percent in excess of equimolar proportions with respect to the said bromobenzene reactant; hydrolyzing the resulting dialkyl ester of phenylboronic acid to phenylboronic acid; and isolating phenylboronic acid from the resulting reaction mass.

10. A method as in claim 9 wherein the trialkyl borate is tributyl borate and the reaction is effected at a temperature ranging from about 95° C. up to the reflux temperature of the reaction mass.

References Cited in the file of this patent

Brindley et al.: "Chem. Soc. Jour." (London), 1955, pp. 2956–2958.

Mikhailov: "Chem. Abstracts," vol. 51, p. 1026 (Jan. 15, 1957).

Mikhailov: "Chem. Abstracts," vol. 51, p. 1874 (Feb. 10, 1957).